UNITED STATES PATENT OFFICE.

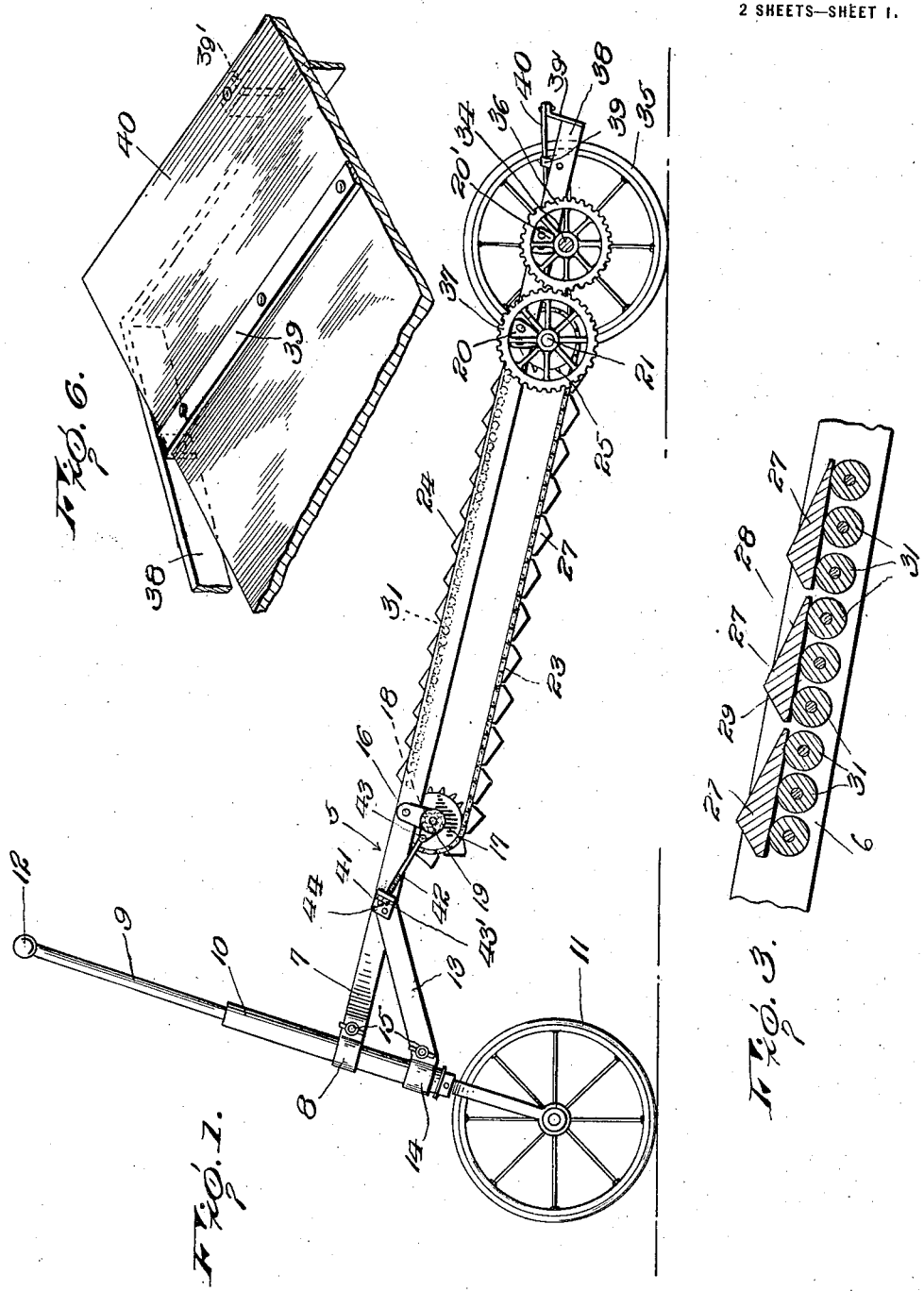

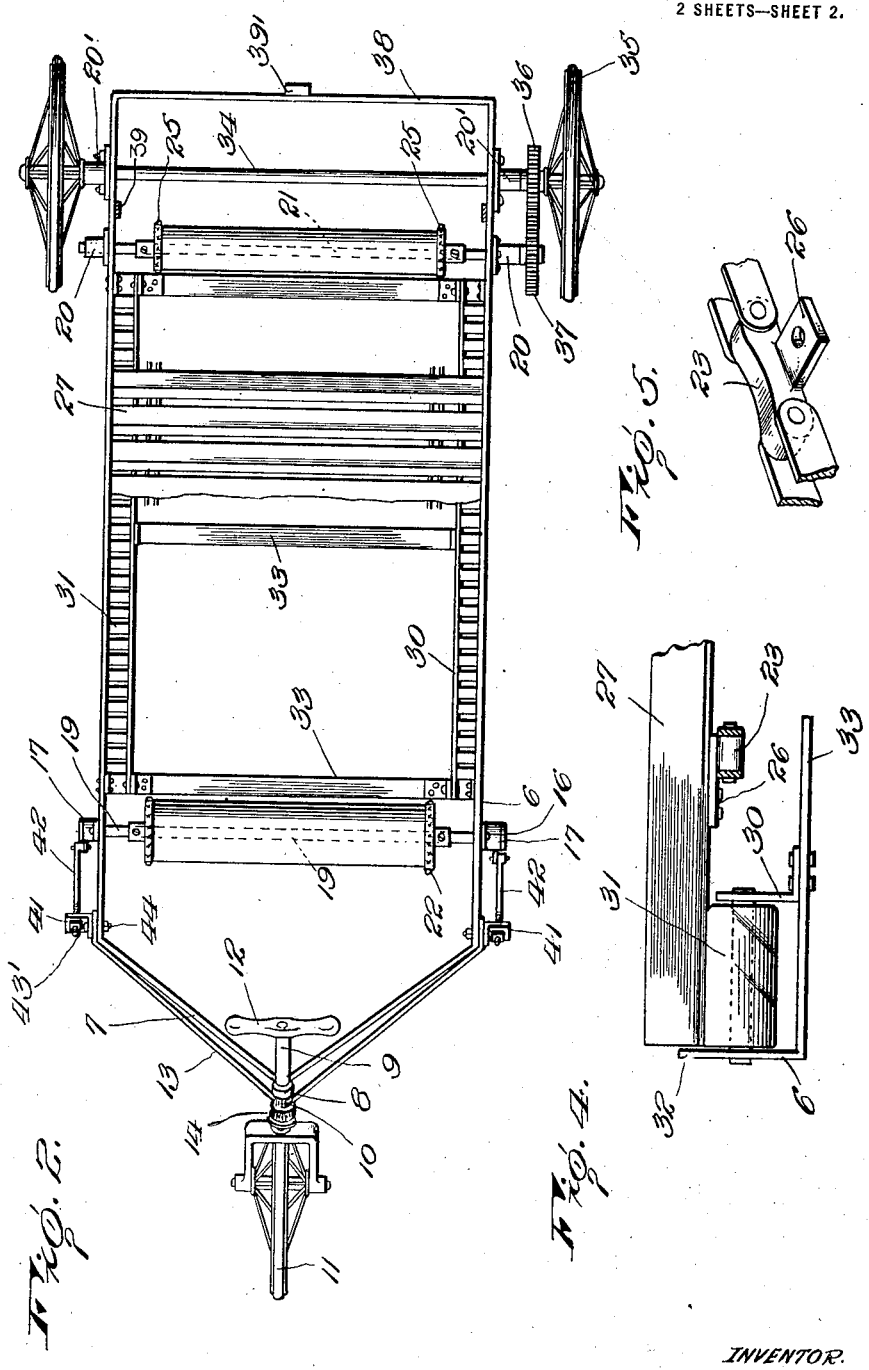

WILLIAM R. YOUNG, OF MEDFORD, OREGON.

TREAD-CYCLE.

1,353,011.  Specification of Letters Patent.  Patented Sept. 14, 1920.

Application filed April 12, 1919. Serial No. 289,578.

*To all whom it may concern:*

Be it known that I, WILLIAM R. YOUNG, a citizen of the United States, residing at Medford, in the county of Jackson and State of Oregon, have invented certain new and useful Improvements in Tread-Cycles, of which the following is a specification.

This invention relates to tread cycles and has for its object the provision of a comparatively simple and thoroughly efficient device of this character which may be propelled by the rider walking or running on an endless tread belt operatively connected with the rear wheels of the vehicle.

The invention further aims to provide a tread cycle including a supporting frame having anti-friction rollers journaled thereon and over which travels the upper stretch of the tread belt, means being provided for adjusting the front end of the frame with respect to the steering post so as to correspondingly vary the angle or inclination of the upper stretch of said tread belt.

A further object of the invention is to provide the supporting frame of the vehicle with a longitudinal extension having a platform mounted thereon and on which the rider may stand when the vehicle is coasting.

The invention further contemplates means for adjusting the tension of the tread belt and means for preventing lateral displacement thereof during rotation of said belt.

A still further object of the invention is generally to improve this class of devices so as to increase their utility, durability and efficiency.

Figure 1 is a side elevation of a tread cycle embodying the present invention;

Fig. 2 is a top plan view thereof, a portion of the tread belt being broken away to expose the anti-friction rollers;

Fig. 3 is a transverse sectional view showing the construction of the slats of the tread belt and the manner of supporting said slats on the anti-friction rollers;

Fig. 4 is a detail transverse sectional view showing the means provided for preventing lateral displacement of the tread belt;

Fig. 5 is a detail perspective view of a portion of the sprocket chain for the tread belt;

Fig. 6 is a fragmentary detail perspective view showing the construction of the coasting platform and manner of supporting said platform on the frame of the vehicle.

Corresponding and like parts are referred to in the following description and indicated in all the views of the drawings by the same reference characters.

The improved tread cycle forming the subject-matter of the present invention is preferably in the form of a three-wheel vehicle and includes a main supporting frame 5, the side bars 6 of which are bent inwardly on converging lines to form a substantially triangular extension 7. The metal at the juncture of the converging portions of the extension 7 is bent to form a substantially cylindrical socket 8 which fits around a tubular member or casing 10 within which is loosely mounted a steering post 9. The lower end of the steering post is bifurcated for the reception of a guiding wheel 11 while the upper end of the post is provided with a suitable handle 12. Secured to the side bars 6 of the main frame at the juncture of the extension 7 therewith are inclined braces 13, the ends of which are connected to form a socket 14 similar in construction to the socket 8 and which socket 14 also embraces the tubular member 10, as best shown in Fig. 1 of the drawings. The sockets 8 and 14 are adjustable vertically of the tubular member 10 so as to vary the angle or inclination of the supporting frame 5 with respect to the ground, said sockets being clamped in adjusted position on the tubular member 10 by means of bolts or similar fastening devices 15 extending through the walls of the sockets, as best shown in Fig. 1 of the drawings. Pivotally mounted at 16 on the side bars 6 at the front of the main supporting frame are journal boxes 17 having anti-friction balls 18 arranged therein and adapted to contact with the adjacent ends of a forward shaft 19. Rigidly secured to the side bars of the frame at the rear end thereof are similar journal boxes 20 in which is journaled a rear shaft 21. Secured to the front shaft 19 are spaced sprocket wheels 22 over which is trained the sprocket chains 23 of an endless tread belt, indicated as a whole at 24. The sprocket chains 23 pass around similar sprocket wheels 25 secured to the rear shaft 21 and extending inwardly from the links of said sprocket chain are laterally extending lugs 26 to which are bolted or otherwise rigidly secured a plurality of transverse slats 27. Each slat 27 is preferably provided with an inclined upper face 28 and a correspondingly inclined forward face 29 so as to permit said slats to be conveniently engaged by the foot of the rider for the purpose of rotating the tread belt.

Spaced inwardly from the side bars 6 of the main supporting frame are longitudinally disposed L-shaped bars 30 and journaled between the bars 30 and the side bars 6 of the frame are suitable rollers 31 adapted to contact with the lower faces of the slats 27 and prevent undue friction between the parts.

The side bars 6 of the frame are preferably extended above the upper edges of the angle bars 30 to form retaining flanges 32 which serve to prevent lateral displacement of the tread belt when in operation. The side bars 6 and angle bars 30 are also connected by one or more transverse braces 33 in order to reinforce and strengthen the structure.

Arranged at the rear end of the supporting frame and journaled in the bearings 20' is a rear axle 34 having ground wheels 35 mounted thereon, one of said ground wheels being loose on the axle and the other provided with a pinion 36 which meshes with a gear wheel 37 secured to the shaft 21 so that as the tread belt is rotated motion will be transmitted therefrom through the medium of the gear 37 and pinion 36 to the rear axle for propelling the vehicle.

The main supporting frame is preferably extended longitudinally beyond the rear axle 34 to form an auxiliary frame 38 having a transverse cleat 39 secured thereto and to which is fastened a removable platform 40 upon which the rider may stand when coasting. A vertical cleat 39' is preferably secured to the rear end of the auxiliary frame for supporting the rear end of the platform, as shown.

Disposed at the junction of the braces 13 with the extension 7 of the frame are angle brackets 41 in which are threaded bolts 42 having their inner ends pivotally connected at 43 with the lower portions of the journal boxes 17 and their outer ends provided with clamping nuts 43' by tightening which the journal boxes 17 may be swung laterally for the purpose of regulating the tension of the tread belt. It will here be noted that the bolts 44 which serve to secure the angle brackets 41 to the main frame also serve to secure the braces 13 thereto.

In operation the rider stands on the tread belt with his hands grasping the steering handle 12 and walks or runs upon the tread belt, thereby rotating the tread belt and transmitting motion through the medium of the aforesaid gearing to the rear wheels of the vehicle for the purpose of propelling the same. After the vehicle has obtained sufficient velocity, the rider may conveniently coast by standing or sitting on the platform 40.

Owing to the construction of the sockets 8 and 14, the frame may be adjusted vertically of the tubular member 10 and the angle or inclination of the tread belt varied at will. It will, of course, be understood that the tread cycles may be made in different sizes and shapes and constructed from any suitable material without departing from the spirit of the invention.

Having thus described the invention, what is claimed as new is:

1. A vehicle of the class described including a wheeled frame, relatively stationary and movable journal boxes mounted on the frame, transverse shafts journaled in said boxes, an endless tread belt extending around said shafts, means for transmitting motion from the tread belt to the wheels of the vehicle, and means operatively connected with the movable journal boxes for tilting the latter to regulate the tension of the tread belt.

2. A vehicle of the class described including a supporting frame, a tubular member connected with the frame, a steering post journaled in said tubular member, spaced wheels disposed at the rear of the frame, a tread belt mounted for rotation on the frame, means for transmitting motion from the tread belt to the rear wheels of the vehicle, and means for adjusting the front end of the frame with respect to the tubular member whereby to vary the inclination of the tread belt.

3. A vehicle of the class described including a wheeled frame, anti-friction devices disposed on the frame, relatively stationary and movable journal boxes depending from the frame, transverse shafts journaled in said boxes, an endless tread belt extending around said shafts and bearing against the anti-friction devices, means for transmitting motion from the tread belt to the rear wheels of the vehicle, and means operatively connected with the movable journal boxes for tilting the latter to regulate the tension of the tread belt.

4. A vehicle of the class described including a wheeled supporting frame, a tubular member connected with the frame, a steering post journaled in said member, rear wheels mounted on the frame, relatively stationary and movable journal boxes depending from the frame, shafts journaled in said boxes provided with sprocket wheels, an endless tread belt including spaced sprocket chains engaging the sprocket wheels and provided with laterally extending attaching lugs upon which transverse slats are secured, brackets fastened to the supporting frame, means for transmitting motion from the tread belt to the rear wheels of the vehicle, and threaded rods extending through the brackets and connected with the movable journal boxes for regulating the tension of the tread belt.

5. A vehicle of the class described including a wheeled supporting frame, anti-friction rollers journaled on the frame, relatively stationary and movable journal boxes depending from the frame, transverse shafts journaled in said boxes, an endless tread belt extending around the shafts and provided with transverse slats having their upper faces inclined and their lower faces flat and bearing against the anti-friction rollers, means for transmitting motion from the tread belt to the rear wheels of the vehicle, and means operatively connected with the movable journal boxes for tilting the latter to vary the tension of the tread belt.

6. A vehicle of the class described including a main supporting frame, ground wheels arranged at the rear of the frame, a steering post arranged at the front of the frame and provided with a steering wheel, longitudinal angle bars forming a part of the frame, rollers journaled between the frame and said angle bars, relatively movable and stationary journal boxes depending from the main frame, transverse shafts journaled in said boxes, an endless tread belt extending around the shafts and provided with slats bearing against the rollers, and means for transmitting motion from the tread belt to the rear wheels of the vehicle.

7. A vehicle of the class described comprising a wheeled supporting frame including longitudinal side bars, braces extending transversely of the frame, longitudinal angle bars secured to said braces and of less height than the side bars of the frame, rollers journaled between the side bars of the frame and said angle bars, relatively stationary and movable journal boxes depending from the side bars of the frame, shafts journaled in said boxes, an endless tread belt extending around the shafts and including spaced slats resting on the rollers, and means for transmitting motion from the tread belt to the rear wheels of the vehicle, the side bars of the frame being extended above the upper edges of the angle bars to form guides for the slats of the tread belt.

8. A vehicle of the class described including a wheeled supporting frame having its forward end provided with an extension formed with a bearing loop, braces connected with the forward extension of the frame and provided with a similar bearing loop, a tubular member extending through said loops, a steering post journaled in the tubular member, fastening devices extending through the walls of the loop for clamping the frame extension and braces on the tubular member, an endless tread belt mounted for rotation on the supporting frame, means for regulating the tension of the tread belt, and means for transmitting motion from the tread belt to the rear wheels of the vehicle.

9. A vehicle of the class described including a supporting frame, relatively stationary and movable journal boxes carried by the frame, transverse shafts journaled in said boxes, an endless tread belt extending around said shafts, a steering wheel arranged at the front of the frame and provided with a steering post, an axle arranged at the rear of the frame and provided with a pinion, a gear secured to one of the transverse shafts and meshing with the pinion on the rear axle for transmitting motion from the tread belt to said axle, ground wheels carried by the axle, a platform supported above the axle, and means operatively connected with the movable journal boxes for tilting the latter to regulate the tension of the tread belt.

10. A vehicle including an elongated supporting frame comprising side bars having their forward ends converging and provided with a bearing loop at the intersection thereof, downwardly inclined converging braces secured to the frame and provided with a similar bearing loop, spaced bars extending transversely of the frame, angle bars of less height than the side bars secured to the transverse bars, rollers journaled between the side bars of the frame and said angle bars, a tubular member fitting in said bearing loops, a steering wheel provided with a steering post journaled in the tubular member, relatively stationary and movable journal boxes carried by the side bars of the frame, transverse axles journaled in said journal boxes, an endless tread belt extending around the shafts and provided with slats bearing against the rollers, a rear axle, ground wheels carried by the rear axle, means for transmitting motion from the tread belt to the rear axle to propel the vehicle, means connected with the movable journal boxes for tilting the latter to regulate the tension of the tread belt, brackets secured to the rear end of the frame, and a movable platform disposed above the rear axle and supported on said brackets.

In testimony whereof I affix my signature.

WILLIAM R. YOUNG. [L. S.]